United States Patent
Elliott et al.

(10) Patent No.: US 9,691,037 B2
(45) Date of Patent: *Jun. 27, 2017

(54) METHODS AND SYSTEMS FOR PROCESSING SCHEDULE DATA

(71) Applicant: CONCUR TECHNOLOGIES, INC., Redmond, WA (US)

(72) Inventors: Bruce Elliott, Woodinville, WA (US); Sofia Krasnovskaya, Kirkland, WA (US); Alan McCloskey, Woodinville, WA (US); Michael Fredericks, Fairfax, VA (US)

(73) Assignee: CONCUR TECHNOLOGIES, INC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,019

(22) Filed: Jan. 15, 2016

(65) Prior Publication Data

US 2016/0132795 A1 May 12, 2016

Related U.S. Application Data

(63) Continuation of application No. 13/606,494, filed on Sep. 7, 2012, now Pat. No. 9,286,601.

(51) Int. Cl.
*G06F 15/167* (2006.01)
*G06Q 10/02* (2012.01)
(Continued)

(52) U.S. Cl.
CPC ........... *G06Q 10/025* (2013.01); *G06Q 10/02* (2013.01); *G06Q 10/06* (2013.01);
(Continued)

(58) Field of Classification Search
CPC .. G06Q 10/02; G06Q 10/06; G06Q 10/06311; G06Q 50/30
See application file for complete search history.

(56) References Cited

U.S. PATENT DOCUMENTS 2,910,238 A 10/1959 Miles et al.
2,995,729 A 8/1961 Steele
(Continued)

FOREIGN PATENT DOCUMENTS

EP 0762306 3/1997
WO WO 00/02152 1/2000
WO WO 01/61607 8/2001

OTHER PUBLICATIONS

PR Newswire, Concur Technologies Launches Concur Expense 7.0, Jul. 24, 2003, p. 1.
(Continued)

*Primary Examiner* — Richard G Keehn
(74) *Attorney, Agent, or Firm* — DLA Piper LLP US

(57) ABSTRACT

Methods and systems comprising receiving travel request data; retrieving schedule data associated with the travel request data, the schedule data being further associated with a scheduled travel time; retrieving availability data associated with the travel request data, the availability data being further associated with an available travel time; generating representation data representing the schedule data and the availability data, the representation data representing the schedule data and/or the availability data differently based on a whether an itinerary complies with an organization's travel policies; and sending the representation data.

34 Claims, 6 Drawing Sheets

(51) Int. Cl.
  *G06Q 10/06*  (2012.01)
  *G06Q 10/10*  (2012.01)
  *G06Q 50/30*  (2012.01)

(52) U.S. Cl.
  CPC ....... *G06Q 10/06311* (2013.01); *G06Q 10/10* (2013.01); *G06Q 10/101* (2013.01); *G06Q 10/109* (2013.01); *G06Q 50/30* (2013.01)

(56) References Cited

U.S. PATENT DOCUMENTS

| | | | |
|---|---|---|---|
| 3,253,262 | A | 5/1966 | Wilenitz et al. |
| 4,755,963 | A | 7/1988 | Denker et al. |
| 4,775,936 | A | 10/1988 | Jung |
| 4,845,625 | A | 7/1989 | Stannard |
| 4,857,840 | A | 8/1989 | Lanchais |
| 4,862,357 | A | 8/1989 | Ahlstrom et al. |
| 4,931,932 | A | 6/1990 | Dalnekoff et al. |
| 5,021,953 | A | 6/1991 | Webber et al. |
| 5,148,365 | A | 9/1992 | Dembo |
| 5,191,523 | A | 3/1993 | Whitesage |
| 5,237,499 | A | 8/1993 | Garback |
| 5,253,165 | A | 10/1993 | Leiseca et al. |
| 5,253,166 | A | 10/1993 | Dettelbach et al. |
| 5,255,184 | A | 10/1993 | Hornick et al. |
| 5,270,921 | A | 12/1993 | Hornick et al. |
| 5,272,638 | A | 12/1993 | Martin et al. |
| 5,283,575 | A | 2/1994 | Kao et al. |
| 5,331,546 | A | 7/1994 | Webber et al. |
| 5,343,388 | A | 8/1994 | Wedelin |
| 5,402,336 | A | 3/1995 | Spiegelhoff et al. |
| 5,570,283 | A | 10/1996 | Shoolery et al. |
| 5,623,413 | A | 4/1997 | Matheson et al. |
| 5,644,721 | A | 7/1997 | Chung et al. |
| 5,648,900 | A | 7/1997 | Bowen et al. |
| 5,652,867 | A | 7/1997 | Barlow et al. |
| 5,739,512 | A | 4/1998 | Tognazzini |
| 5,802,492 | A | 9/1998 | DeLorme et al. |
| 5,802,511 | A | 9/1998 | Kouchi et al. |
| 5,832,451 | A | 11/1998 | Flake et al. |
| 5,832,452 | A | 11/1998 | Schneider et al. |
| 5,832,453 | A | 11/1998 | O'Brien |
| 5,832,454 | A | 11/1998 | Jafri et al. |
| 5,850,617 | A | 12/1998 | Libby |
| 5,897,620 | A | 4/1999 | Walker et al. |
| 5,899,981 | A | 5/1999 | Taylor et al. |
| 5,948,040 | A | 9/1999 | Delorme et al. |
| 6,009,408 | A | 12/1999 | Buchanan |
| 6,023,679 | A | 2/2000 | Acebo et al. |
| 6,029,144 | A | 2/2000 | Barrett et al. |
| 6,085,169 | A | 7/2000 | Walker et al. |
| 6,115,680 | A | 9/2000 | Coffee et al. |
| 6,199,050 | B1 | 3/2001 | Alaia et al. |
| 6,275,808 | B1 | 8/2001 | DeMarcken |
| 6,295,521 | B1 | 9/2001 | DeMarcken et al. |
| 6,298,328 | B1 | 10/2001 | Healy et al. |
| 6,307,572 | B1 | 10/2001 | Demarcken et al. |
| 6,336,097 | B1 | 1/2002 | Scipioni |
| 6,360,205 | B1 | 3/2002 | Iyengar et al. |
| 6,377,932 | B1 | 4/2002 | DeMarcken |
| 6,381,578 | B1 | 4/2002 | DeMarcken |
| 6,434,533 | B1 | 8/2002 | Fitzgerald |
| 6,442,526 | B1 | 8/2002 | Vance |
| 6,446,048 | B1 | 9/2002 | Wells et al. |
| 6,493,695 | B1 | 12/2002 | Pickering et al. |
| 6,553,346 | B1 | 4/2003 | Walker et al. |
| 6,609,098 | B1 | 8/2003 | DeMarcken |
| 6,711,474 | B1 | 3/2004 | Treyz et al. |
| 6,801,226 | B1 | 10/2004 | Daughtrey |
| 6,826,473 | B1 | 11/2004 | Burch et al. |
| 6,847,824 | B1 | 1/2005 | Contractor |
| 6,868,400 | B1 | 3/2005 | Sundaresan et al. |
| 7,050,986 | B1 | 5/2006 | Vance et al. |
| 7,103,558 | B1 | 9/2006 | Patton et al. |
| 7,158,980 | B2 | 1/2007 | Shen |
| 7,194,417 | B1 | 3/2007 | Jones |
| 7,249,041 | B2 | 7/2007 | Last |
| 7,263,664 | B1 | 8/2007 | Daughtrey |
| 7,277,923 | B2 | 10/2007 | Rensin et al. |
| 7,328,166 | B1 | 2/2008 | Geoghegan et al. |
| 7,330,110 | B1 | 2/2008 | Heintzman et al. |
| 7,343,295 | B2 | 3/2008 | Pomerance |
| 7,349,894 | B2 | 3/2008 | Barth et al. |
| 7,366,682 | B1 | 4/2008 | Katiyar et al. |
| 7,395,231 | B2 | 7/2008 | Steury et al. |
| 7,401,029 | B2 | 7/2008 | Gillespie |
| 7,409,643 | B2 | 8/2008 | Daughtrey |
| 7,483,883 | B2 | 1/2009 | Barth et al. |
| 7,493,261 | B2 | 2/2009 | Chen et al. |
| 7,502,746 | B2 | 3/2009 | Bertram et al. |
| 7,516,089 | B1 | 4/2009 | Walker et al. |
| 7,539,620 | B2 | 5/2009 | Winterton et al. |
| 7,548,615 | B2 | 6/2009 | Bhalgat et al. |
| 7,555,387 | B2 | 6/2009 | Sladky et al. |
| 7,746,510 | B2 | 6/2010 | Pandipati |
| 7,949,579 | B2 | 5/2011 | Keld |
| 7,974,892 | B2 | 7/2011 | Fredericks et al. |
| 8,009,334 | B2 | 8/2011 | Pandipati |
| 8,140,361 | B2 | 3/2012 | Fredericks et al. |
| 8,195,194 | B1 | 6/2012 | Tseng |
| 8,203,765 | B2 | 6/2012 | Pandipati |
| 8,224,830 | B2 | 7/2012 | Bidlack |
| 8,271,337 | B1 | 9/2012 | Norins |
| 8,373,912 | B2 | 2/2013 | Pandipati |
| 8,560,355 | B2 * | 10/2013 | Adamson ............... G06Q 10/02 705/5 |
| 8,620,750 | B2 | 12/2013 | Depasquale et al. |
| 8,693,070 | B2 | 4/2014 | Pandipati |
| 8,712,811 | B2 | 4/2014 | Fredericks et al. |
| 8,766,795 | B1 * | 7/2014 | Causey ................... G08B 1/08 340/3.7 |
| 9,286,601 | B2 | 3/2016 | Elliott et al. |
| 9,400,959 | B2 | 7/2016 | Ollenberger et al. |
| 2001/0032988 | A1 | 10/2001 | Yoshida et al. |
| 2001/0042032 | A1 | 11/2001 | Crawshaw et al. |
| 2001/0051911 | A1 | 12/2001 | Marks et al. |
| 2001/0053999 | A1 | 12/2001 | Feinberg |
| 2002/0007327 | A1 | 1/2002 | Steury et al. |
| 2002/0026416 | A1 | 2/2002 | Provinse |
| 2002/0029176 | A1 | 3/2002 | Carlson et al. |
| 2002/0042715 | A1 | 4/2002 | Kelley |
| 2002/0065688 | A1 | 5/2002 | Charlton et al. |
| 2002/0069093 | A1 | 6/2002 | Stanfield |
| 2002/0077871 | A1 | 6/2002 | Udelhoven et al. |
| 2002/0095256 | A1 | 7/2002 | Jones et al. |
| 2002/0100803 | A1 | 8/2002 | Sehr |
| 2002/0120765 | A1 | 8/2002 | Boehmke |
| 2002/0124067 | A1 | 9/2002 | Parupudi et al. |
| 2002/0128971 | A1 | 9/2002 | Narasimhan |
| 2002/0147619 | A1 | 10/2002 | Floss et al. |
| 2002/0147678 | A1 | 10/2002 | Drunsic |
| 2002/0152100 | A1 | 10/2002 | Chen et al. |
| 2002/0152101 | A1 | 10/2002 | Lawson et al. |
| 2002/0161610 | A1 | 10/2002 | Walker et al. |
| 2002/0169509 | A1 | 11/2002 | Huang et al. |
| 2002/0173978 | A1 | 11/2002 | Boies et al. |
| 2003/0023463 | A1 | 1/2003 | Dombroski et al. |
| 2003/0036918 | A1 | 2/2003 | Pintsov |
| 2003/0040987 | A1 | 2/2003 | Hudson et al. |
| 2003/0046195 | A1 | 3/2003 | Mao |
| 2003/0065805 | A1 | 4/2003 | Barnes, Jr. |
| 2003/0088487 | A1 | 5/2003 | Cheng et al. |
| 2003/0115141 | A1 | 6/2003 | Felix et al. |
| 2003/0120526 | A1 | 6/2003 | Altman et al. |
| 2003/0141411 | A1 | 7/2003 | Pandya |
| 2003/0171990 | A1 | 9/2003 | Rao et al. |
| 2003/0187705 | A1 | 10/2003 | Schiff |
| 2003/0225600 | A1 | 12/2003 | Slivka et al. |
| 2004/0002876 | A1 | 1/2004 | Sommers et al. |
| 2004/0044674 | A1 | 3/2004 | Mohammadioun et al. |
| 2004/0083134 | A1 | 4/2004 | Spero et al. |
| 2004/0128193 | A1 * | 7/2004 | Brice ................... G06Q 30/02 705/14.25 |
| 2004/0167808 | A1 | 8/2004 | Fredericks et al. |

(56) References Cited

U.S. PATENT DOCUMENTS

| | | |
|---|---|---|
| 2004/0193457 A1 | 9/2004 | Shogren |
| 2004/0198386 A1 | 10/2004 | Dupray |
| 2004/0210497 A1 | 10/2004 | Hirayama et al. |
| 2004/0210513 A1 | 10/2004 | Harford et al. |
| 2004/0215566 A1 | 10/2004 | Meurer |
| 2004/0243489 A1 | 12/2004 | Mitchell et al. |
| 2004/0267555 A1 | 12/2004 | Dale |
| 2005/0004830 A1 | 1/2005 | Rozell et al. |
| 2005/0015272 A1 | 1/2005 | Wind |
| 2005/0015295 A1 | 1/2005 | McCulloch |
| 2005/0027705 A1 | 2/2005 | Sadri et al. |
| 2005/0033616 A1 | 2/2005 | Vavul et al. |
| 2005/0033668 A1 | 2/2005 | Garcia et al. |
| 2005/0108068 A1 | 5/2005 | Marcken et al. |
| 2005/0108069 A1 | 5/2005 | Shiran et al. |
| 2005/0108117 A1 | 5/2005 | Newman |
| 2005/0131770 A1 | 6/2005 | Agrawal |
| 2005/0165680 A1 | 7/2005 | Keeling et al. |
| 2005/0203760 A1 | 9/2005 | Gottumukkala et al. |
| 2005/0222854 A1 | 10/2005 | Dale et al. |
| 2005/0222944 A1 | 10/2005 | Dodson, Jr. et al. |
| 2005/0240601 A1 | 10/2005 | Lyons et al. |
| 2005/0251430 A1 | 11/2005 | Jindel |
| 2005/0267787 A1 | 12/2005 | Rose |
| 2005/0288973 A1 | 12/2005 | Taylor et al. |
| 2005/0288976 A1* | 12/2005 | Abrams ............... G06Q 10/02 705/6 |
| 2005/0289025 A1 | 12/2005 | Fredericks et al. |
| 2006/0046740 A1 | 3/2006 | Johnson |
| 2006/0053053 A1 | 3/2006 | Baggett |
| 2006/0069504 A1 | 3/2006 | Bradley et al. |
| 2006/0069592 A1 | 3/2006 | Di Florio et al. |
| 2006/0080126 A1 | 4/2006 | Greer et al. |
| 2006/0089907 A1 | 4/2006 | Kohlmaier et al. |
| 2006/0106655 A1 | 5/2006 | Lettovsky et al. |
| 2006/0167834 A1 | 7/2006 | Rubel, Jr. |
| 2006/0206363 A1 | 9/2006 | Gove |
| 2006/0206506 A1 | 9/2006 | Fitzpatrick |
| 2006/0212321 A1 | 9/2006 | Vance et al. |
| 2006/0241909 A1 | 10/2006 | Morgan et al. |
| 2006/0241983 A1 | 10/2006 | Viale et al. |
| 2006/0247993 A1 | 11/2006 | Scanlan et al. |
| 2006/0277079 A1 | 12/2006 | Gilligan et al. |
| 2006/0287880 A1 | 12/2006 | Fitzgerald et al. |
| 2006/0293931 A1 | 12/2006 | Fitzgerald et al. |
| 2007/0067193 A1 | 3/2007 | Robertson |
| 2007/0073562 A1 | 3/2007 | Brice et al. |
| 2007/0083401 A1 | 4/2007 | Vogel et al. |
| 2007/0094056 A1 | 4/2007 | Kang et al. |
| 2007/0143155 A1 | 6/2007 | Whitsett et al. |
| 2007/0179863 A1 | 8/2007 | Stoll |
| 2007/0250357 A1 | 10/2007 | Steury et al. |
| 2008/0052217 A1 | 2/2008 | Etkin |
| 2008/0072067 A1 | 3/2008 | Koretz |
| 2008/0082373 A1 | 4/2008 | Durocher et al. |
| 2008/0086455 A1 | 4/2008 | Meisels et al. |
| 2008/0091482 A1 | 4/2008 | Whitsett et al. |
| 2008/0097873 A1 | 4/2008 | Cohen et al. |
| 2008/0126143 A1 | 5/2008 | Altman et al. |
| 2008/0154876 A1 | 6/2008 | Hao |
| 2008/0167887 A1 | 7/2008 | Marcken |
| 2008/0189148 A1 | 8/2008 | Diaz et al. |
| 2008/0198761 A1 | 8/2008 | Murawski |
| 2008/0215406 A1* | 9/2008 | Pachon ............... G06Q 10/06 705/7.16 |
| 2008/0221936 A1 | 9/2008 | Patterson |
| 2008/0262878 A1* | 10/2008 | Webby ............... G06Q 10/02 705/5 |
| 2008/0270224 A1 | 10/2008 | Portman et al. |
| 2008/0319808 A1 | 12/2008 | Wofford et al. |
| 2009/0006143 A1 | 1/2009 | Orttung et al. |
| 2009/0012824 A1 | 1/2009 | Brockway et al. |
| 2009/0099965 A1 | 4/2009 | Grant |
| 2009/0125321 A1 | 5/2009 | Charlebois et al. |
| 2009/0157513 A1 | 6/2009 | Bonev et al. |
| 2009/0187449 A1* | 7/2009 | van Tulder ............ G06Q 10/06 705/7.17 |
| 2009/0210262 A1 | 8/2009 | Rines |
| 2009/0216746 A1 | 8/2009 | Aubin et al. |
| 2009/0234818 A1 | 9/2009 | Lobo et al. |
| 2009/0271302 A1 | 10/2009 | Hamper |
| 2009/0287546 A1 | 11/2009 | Gillespie et al. |
| 2010/0017316 A1 | 1/2010 | Joseph et al. |
| 2010/0045705 A1 | 2/2010 | Vertegaal |
| 2010/0057502 A1 | 3/2010 | Arguelles |
| 2010/0057503 A1 | 3/2010 | Katz |
| 2010/0121660 A1* | 5/2010 | Boykin ................ G06Q 10/02 705/5 |
| 2010/0175001 A1* | 7/2010 | Lazarus .............. G06Q 10/109 715/753 |
| 2010/0191550 A1 | 7/2010 | Hutson |
| 2010/0198680 A1 | 8/2010 | Ma et al. |
| 2010/0228628 A1 | 9/2010 | Dufour |
| 2010/0257003 A1 | 10/2010 | Fredericks et al. |
| 2010/0257195 A1* | 10/2010 | Inoue ................ G01C 21/3602 707/769 |
| 2010/0069093 A1 | 11/2010 | Carlson et al. |
| 2010/0305984 A1 | 12/2010 | Ben-Yitschak |
| 2011/0029413 A1 | 2/2011 | Ben-Tzur et al. |
| 2011/0045801 A1 | 2/2011 | Parker, II |
| 2011/0060480 A1* | 3/2011 | Mottla ................ G06Q 10/02 701/2 |
| 2011/0137768 A1 | 6/2011 | Onishi et al. |
| 2011/0246246 A1 | 10/2011 | Johnson |
| 2011/0258005 A1 | 10/2011 | Fredericks et al. |
| 2011/0258006 A1 | 10/2011 | Koetting et al. |
| 2011/0270715 A1* | 11/2011 | Moorhead ............ G06Q 10/02 705/27.2 |
| 2011/0282964 A1 | 11/2011 | Krishnaswamy |
| 2011/0288768 A1* | 11/2011 | Stefani .............. G06Q 30/0281 701/533 |
| 2011/0307280 A1 | 12/2011 | Mandelbaum |
| 2012/0046049 A1 | 2/2012 | Curtis |
| 2012/0059745 A1 | 3/2012 | Fredericks et al. |
| 2012/0101858 A1 | 4/2012 | Depasquale et al. |
| 2012/0101901 A1 | 4/2012 | Depasquale et al. |
| 2012/0150572 A1 | 6/2012 | Fredericks et al. |
| 2012/0157795 A1 | 6/2012 | Chiu et al. |
| 2012/0185368 A1 | 7/2012 | Schloter et al. |
| 2012/0209640 A1 | 8/2012 | Hamper |
| 2012/0281584 A1 | 11/2012 | Powers |
| 2012/0321281 A1* | 12/2012 | Hilem ................ H04N 9/8233 386/241 |
| 2012/0330906 A1 | 12/2012 | Fredericks et al. |
| 2013/0041696 A1 | 2/2013 | Richard |
| 2013/0054542 A1 | 2/2013 | Ollenberger et al. |
| 2013/0090966 A1 | 4/2013 | Rivere |
| 2013/0110833 A1 | 5/2013 | Fredericks et al. |
| 2013/0166607 A1 | 6/2013 | Turk et al. |
| 2013/0197948 A1 | 8/2013 | Fredericks et al. |
| 2013/0218613 A1 | 8/2013 | Fredericks et al. |
| 2013/0218615 A1 | 8/2013 | Fredericks et al. |
| 2013/0227040 A1 | 8/2013 | Fredericks et al. |
| 2013/0268878 A1* | 10/2013 | Le Roux ............. G09B 9/08 715/772 |
| 2013/0329943 A1 | 12/2013 | Christopulos et al. |
| 2014/0074958 A1 | 3/2014 | Elliott et al. |
| 2014/0095221 A1 | 4/2014 | Lore et al. |
| 2014/0122239 A1 | 5/2014 | Depasquale et al. |
| 2014/0250122 A1 | 9/2014 | Fredericks et al. |
| 2014/0270575 A1 | 9/2014 | Rajkarnikar et al. |
| 2014/0279268 A1 | 9/2014 | Muller et al. |
| 2014/0288981 A1 | 9/2014 | Rajkarnikar et al. |
| 2014/0350972 A1 | 11/2014 | Haywood et al. |
| 2016/0132795 A1 | 5/2016 | Elliott et al. |
| 2016/0132977 A1 | 5/2016 | Fredericks et al. |
| 2016/0239515 A1 | 8/2016 | Ollenberger et al. |

OTHER PUBLICATIONS

"Gelco Information", Business Wire, Mar. 17, 1998.
"American Express Announces New Features in the latest Release of AXI(SM) at Corporate Travel World", PR Newswire, Mar. 2, 1998, p. 0302NYM159.

(56) References Cited

OTHER PUBLICATIONS

"Thread: Pay Per Impression Programs", Digital Point Forums, Mar. 2005, found online at forums.digitalpoint.com/showthread.php?t=12248.

Nancy Trejos, "Travelers have no patience for slow mobile websites", dated May 6, 2012, http://www.usatoday.com/USCP/PNI/Features/2012-05-06-PNI0506tra-website-speedART_ST_U.htm.

Gary Stoller, "For Travel Companies, the slower the website, the smaller the potential profit", dated Jun. 1, 2011, http://www.usatoday.com/MONEY/usaedition/2011-06-02-travelweb-27ART_CV_U.htm.

Oct. 22, 2009, "Suppliers Work on Ancillary Air Fee Reporting" McNulty Business Travel News.

www.concur.com, from Web Archive, http://web.archive.org/web/20000622043004/http://www.concur.com/, archived Jun. 22, 2000, printed Jan. 6, 2014 (61 pages).

www.outtask.com, from Web Archive, http://web.archive.org/web/20001009025559/http://www.outtask.com/, archived Oct. 9, 2000, printed Jan. 6, 2014 (8 pages).

Joseph Kornick, "Firm's new system tracks, refunds unused e-tickets" Travel Weekly, May 20, 1999.

Tripit, "Flight Duplicates: Conflict Resolved", Sep. 13, 2010, Concur, 3 pages.

Juile Barker, "Keeping Control When Hotel Costs Soar", Successful Meetings, vol. 47, No. 3, pp. 31, Mar. 1998.

David Eisen, "Setting Up a Hotel Program", Business Travel News, vol. 23, No. 7, pp. 58(8) Apr. 24, 2006.

Edward P. Gilligan, "Trimming Your T&E is Easier Than You Think", Managing Office Technology, vol. 40, No. 11, pp. 39-40, Nov. 1995.

Mal Gormley, "NBAA's Travel$ense", Business and Commercial Aviation, vol. 79, No. 2, pp. 60, Aug. 29, 1996.

Eric K. Clemons et al., "Ahead of the Pack Through Vision and Hustle: A Case Study of Information Technology at Rosenbluth Travel", IEEE, pp. 287-296 (1991).

Bruce Schumacher, "Proactive Flights Schedule Evaluation at Delta Air Lines", Proceedings of the 1999 Winter Simulation Conference, pp. 1232-1237 (1999).

Paul Katz et al., "Making the Most of a Telephone Company's Purchasing Power", Belcore Exchange, pp. 23-27, Mar./Apr. 1990.

Amir A. Sadrian et al., "A Procurement Decision Support System in Business Volume Discount Environments", Operations Research, vol. 42, No. 1, pp. 14-23, Jan.-Feb. 1994.

Amir A. Sadrian et al., "Business Volume Discount: A New Perspective on Discount Pricing Strategy", The National Association of Purchasing Management, Inc., pp. 43-46, Apr. 1992.

James V. Jucker et al., "Single-Period Inventory Models with Demand Uncertainty and Quantity Discounts: Behavioral Implications and a New Solution Procedure", Naval Research Logistics Quarterly, vol. 32, pp. 537-550 (1985).

Robert J. Dolan, "Quantity Discounts: Managerial Issues and Research Opportunities", Marketing Science, vol. 6, No. 1, pp. 1-24, Winter 1987.

Z. Drezner et al., "Theory and Methodology: Multi-buyer discount pricing", European Journal of Operational Research, vol. 40, pp. 38-42 (1989).

Hasan Pirkul et al., "Capacitated Multiple Item Ordering Problem with Quantity Discounts", IIE Transactions, vol. 17, No. 3, pp. 206-211, Sep. 1985.

Paul Katz et al., "Telephone Companies Analyze Price Quotations with Bellcore's PDSS Software", Interfaces 24, pp. 50-63, Jan. 1-Feb. 1994.

Ram Narasimhan et al., "Optimizing Aggregate Procurement Allocation Decisions", Journal of Purchasing and Materials Management, pp. 23-30, May 1986.

James C. Bean et al., "Reducing Travelling Costs and Player Fatigue in the National Basketball Association", Interfaces, vol. 10, No. 3, pp. 98-102, Jun. 1980.

Gerard Francois, "Socrate: Un Projet Strategique de al SNCF au Services des Voyageures", Revue Generale Des Chemins De Fer, Suppl. No. 6, pp. 7-9, Jun. 1990.

Robert A. Russell et al., "Devising a Cost Effective Schedule for a Baseball League", Operations Research, vol. 42, No. 4, pp. 614-625, Jul.-Aug. 1994.

Jacques A. Ferland et al., "Computer Aided Scheduling for a Sport League", Infor., vol. 29, No. 1, pp. 14-25, Feb. 1991.

Jeffrey L. Huisingh et al., "OffSite: Federal Employee Training Site Selection Software", US Army Tradoc Analysis Center—Monterey Technical Report No. 98-02, Nov. 1998 (163 pages).

Jeffrey Huisingh et al., "New Travel Software Save Time, Money", http://www.dla.mil/Dimensions/Septoct99/Sep98//Sep_page_19.htm, Sep./Oct. 1998 (5 pages).

David A. Shepherd, "A Slam Model of Domestic Airline Passenger Fares and the Contract Air Service Program", Air Force Inst. of Tech., Wright-Patterson AFG, OH. School of Systems and Logistics, Sep. 1986 (136 pages).

R.A. Russell, "Scheduling the Texas League with Multiple Objectives", 1994 Proceedings Decisions Sciences Institute, pp. 1248-1250,1994.

D. Bartholomew, "Cleared for Takeoff", InformationWeek, pp. 55, Mar. 1993.

Matthew E. Berge et al., "Demand Drive Dispatch: A method for Dynamic Aircraft Capacity Assignment, Models and Algorithms", Operations Research, vol. 41, No. 1, pp. 153-168, Jan.-Feb. 1993.

File History of U.S. Appl. No. 10/373,096.
File History of U.S. Appl. No. 10/270,672.
File History of U.S. Appl. No. 11/159,398.
File History of U.S. Appl. No. 12/755,127.
File History of U.S. Appl. No. 12/773,282.
File History of U.S. Appl. No. 11/763,562.
File History of U.S. Appl. No. 12/901,947.
File History of U.S. Appl. No. 13/117,303.
File History of U.S. Appl. No. 13/277,916.
File History of U.S. Appl. No. 13/277,923.
File History of U.S. Appl. No. 13/396,255.
File History of U.S. Appl. No. 13/602,589.
File History of U.S. Appl. No. 13/593,108.
File History of U.S. Appl. No. 13/606,494.
File History of U.S. Appl. No. 13/712,614.
File History of U.S. Appl. No. 13/712,629.
File History of U.S. Appl. No. 11/774,489.
File History of U.S. Appl. No. 12/371,548.
File History of U.S. Appl. No. 13/842,913.
File History of U.S. Appl. No. 13/830,410.
File History of U.S. Appl. No. 13/830,319.
File History of U.S. Appl. No. 14/036,320.
File History of U.S. Appl. No. 14/060,960.
File History of U.S. Appl. No. 14/188,414.
File History of U.S. Appl. No. 14/213,523.
File History of U.S. Appl. No. 14/213,550.
File History of U.S. Appl. No. 14/219,745.
File History of U.S. Appl. No. 12/465,067.
File History of U.S. Appl. No. 09/784,836.
File History of U.S. Appl. No. 10/225,736.
File History of U.S. Appl. No. 11/983,949.
File History of U.S. Appl. No. 14/994,822.
U.S. Appl. No. 10/225,736, filed Aug. 22, 2002.
U.S. Appl. No. 11/983,949, filed Nov. 13, 2007.
File History of U.S. Appl. No. 15/137,196.
File History of U.S. Appl. No. 12/773,282, May 23, 2017 for Feb. 23, 2017 to May 23, 2017.
File History of U.S. Appl. No. 12/901,947, May 23, 2017 for Feb. 23, 2017 to May 23, 2017.
File History of U.S. Appl. No. 13/117,303, May 23, 2017 for Feb. 23, 2017 to May 23, 2017.
File History of U.S. Appl. No. 13/277,916, May 23, 2017 for Feb. 23, 2017 to May 23, 2017.
File History of U.S. Appl. No. 13/396,255, May 23, 2017 for Feb. 23, 2017 to May 23, 2017.
File History of U.S. Appl. No. 14/060,960, May 23, 2017 for Feb. 23, 2017 to May 23, 2017.

(56) References Cited

OTHER PUBLICATIONS

File History of U.S. Appl. No. 14/213,550, May 23, 2017 for Feb. 23, 2017 to May 23, 2017.
File History of U.S. Appl. No. 12/465,067, May 23, 2017 for Feb. 23, 2017 to May 23, 2017.
File History of U.S. Appl. No. 15/489,361, May 23, 2017.
File History of U.S. Appl. No. 13/830,410, May 23, 2017 for Feb. 23, 2017 to May 23, 2017.

* cited by examiner

FIGURE 4C

METHODS AND SYSTEMS FOR PROCESSING SCHEDULE DATA

CROSS-REFERENCE TO RELATED APPLICATION

This application is a Continuation of U.S. patent application Ser. No. 13/606,494 filed Sep. 7, 2012, which is incorporated by reference in its entirety.

BRIEF DESCRIPTION OF THE DRAWINGS

FIGS. 4A-4C depict an interface, according to embodiments of the invention.

DETAILED DESCRIPTION OF SEVERAL EMBODIMENTS

The systems and methods described herein may use one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant art, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

Computers may be interconnected via one or more networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, WiMax, or other wireless connection). Connections between computers may use any protocols, including connection oriented protocols such as TCP or connectionless protocols such as UDP. Any connection through which at least two computers may exchange data may be the basis of a network.

Figure 1:
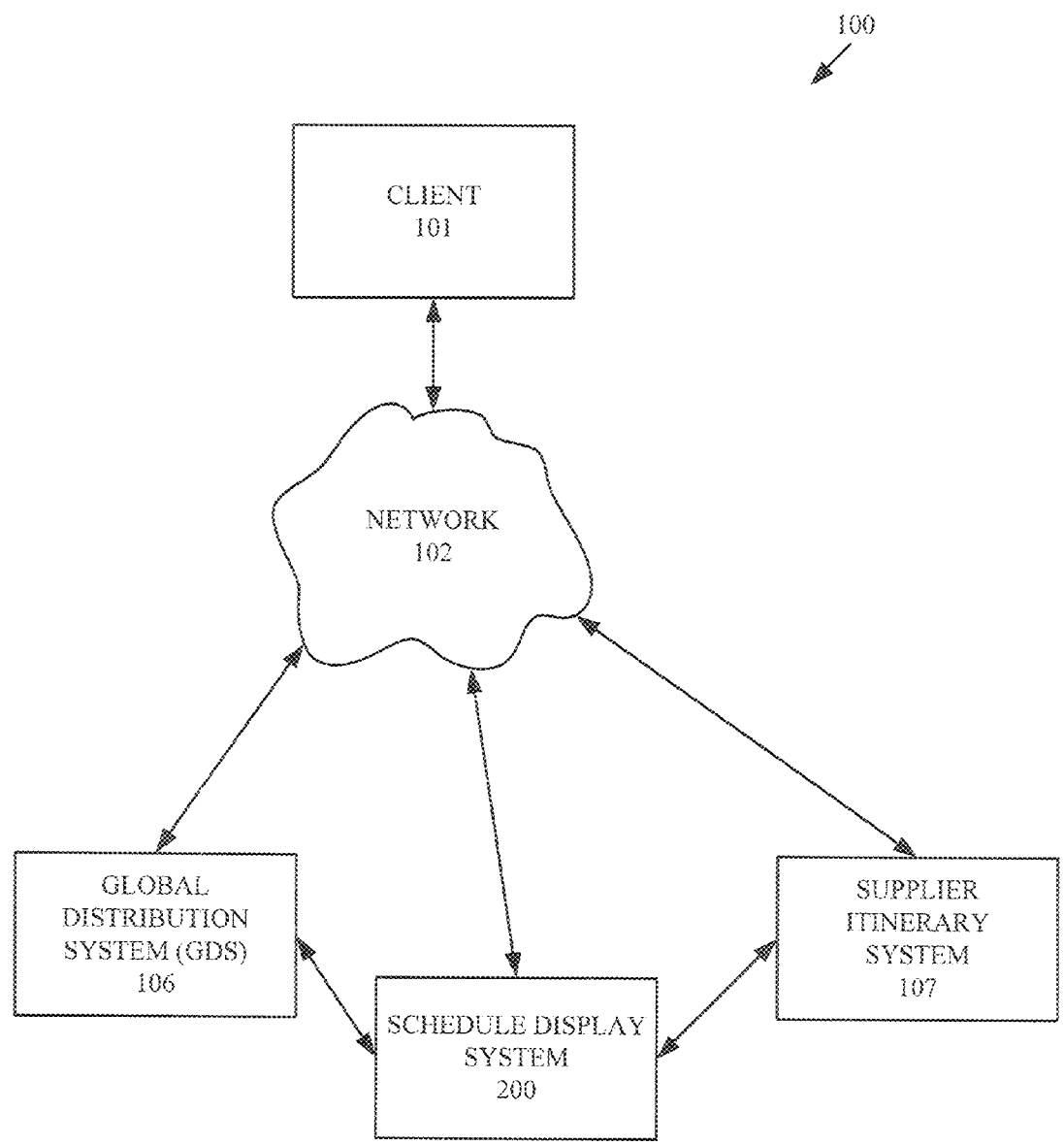
FIG. 1 depicts a system, according to an embodiment of the invention.

FIG. 1 depicts a system 100 according to an embodiment of the invention. Elements of the system 100 may enable the display of information such as travel schedule information. The system 100 of FIG. 1 may comprise one or more computers in communication with one another via a network 102 such as the internet. Those of ordinary skill in the art will appreciate that other embodiments may comprise computers that are interconnected via other types of networks. One or more of the computers may be client computers 101. Client computers 101 may be personal computers or hand-held devices including web browsers, for example. Rich travel information may be displayed in a concise graphical format, allowing for display on, for example, a large personal computer screen, a smaller mobile phone screen, or displays of any size in between which may be associated with a client computer 101. One or more of the computers may be global distribution systems (GDS) 106 such as Sabre, Apollo, Galileo, Worldspan, Amadeus, or Abacus, or supplier itinerary systems 107, which may be associated with suppliers of various products or services. One or more of the computers may comprise a schedule display system 200, which may communicate with the GDS 106, supplier itinerary system 107, client computers 101, or any combination thereof, as described in greater detail below. The schedule display system 200 may receive travel request information from a client device over a computer network, for example. This travel request information may include an origin and one or more destinations, and requested dates and/or dates and times for departure from and/or arrival at each location. The schedule display system 200 may return schedule information for various options available to meet these requests to the client computer 101. The client computer 101 may display the schedule information.

Figure 2:
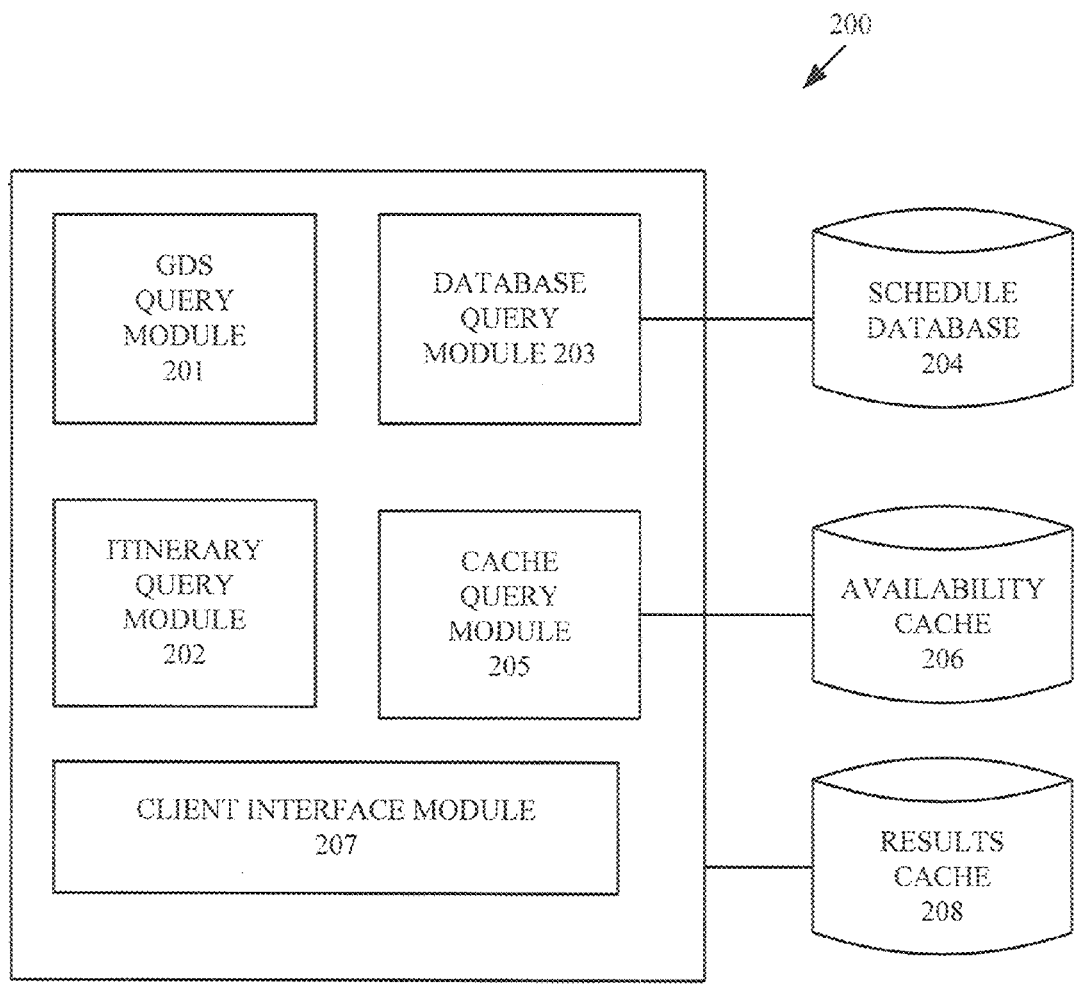
FIG. 2 depicts a scheduling display system, according to an embodiment of the invention.

FIG. 2 depicts details of a schedule display system 200 according to an embodiment of the invention. The schedule display system 200 in this embodiment may be in communication with the network 102, GDS 106, supplier itinerary systems 107, or any combination thereof, as described above. The schedule display system 200 may comprise a GDS query module 201, an itinerary query module 202, a database query module 203, a cache query module 205, a client interface module 207, or a results cache 208, or any combination thereof. The functions of these components are described in greater detail with respect to FIGS. 4A-4C below. The schedule display system 200 may also comprise a schedule database 204 and/or an availability cache 206. The schedule database 204 may include schedule data for a variety of travel options. For example, the schedule database 204 may include an airline schedule database such as that provided by OAG. The availability cache 206 may store recent search results which may provide an approximate understanding of what options may or may not be available.

For example, there are many places to get schedules: a GDS, airlines, data feed (e.g., OAG) with just schedules. OAG may not tell you what is sold out or the price, but it may be very fast and inexpensive to look up this information. A GDS may also tell us this information, but it may take longer and be more expensive to ask and get a response (e.g., 15 seconds). We may want to strike a balance between the two. The availability cache 206 may take slow sources that have real availability and cache that information so it is faster to look it up, even though this cached information may change since it has been cached. The schedule database 204 may, for example, comprise OAG data, which is fast to obtain. 201 is slow so we can cache that (208). The GDS query module 201 may also query client interface module 207. Accessing supplier itinerary system 107 and/or GDS 106 may be slow, so we can cache this information in results cache 208. In an embodiment, the results cache 208 and availability cache 206 may be combined. It will be understood by those of ordinary skill in the relevant art that components may be omitted, changed, and/or added in various embodiments. In some cases, the components may be distributed among multiple computers. It will be further understood by those of ordinary skill in the relevant art that different components may perform the functions described below than those shown in this FIGURE.

Figure 3:
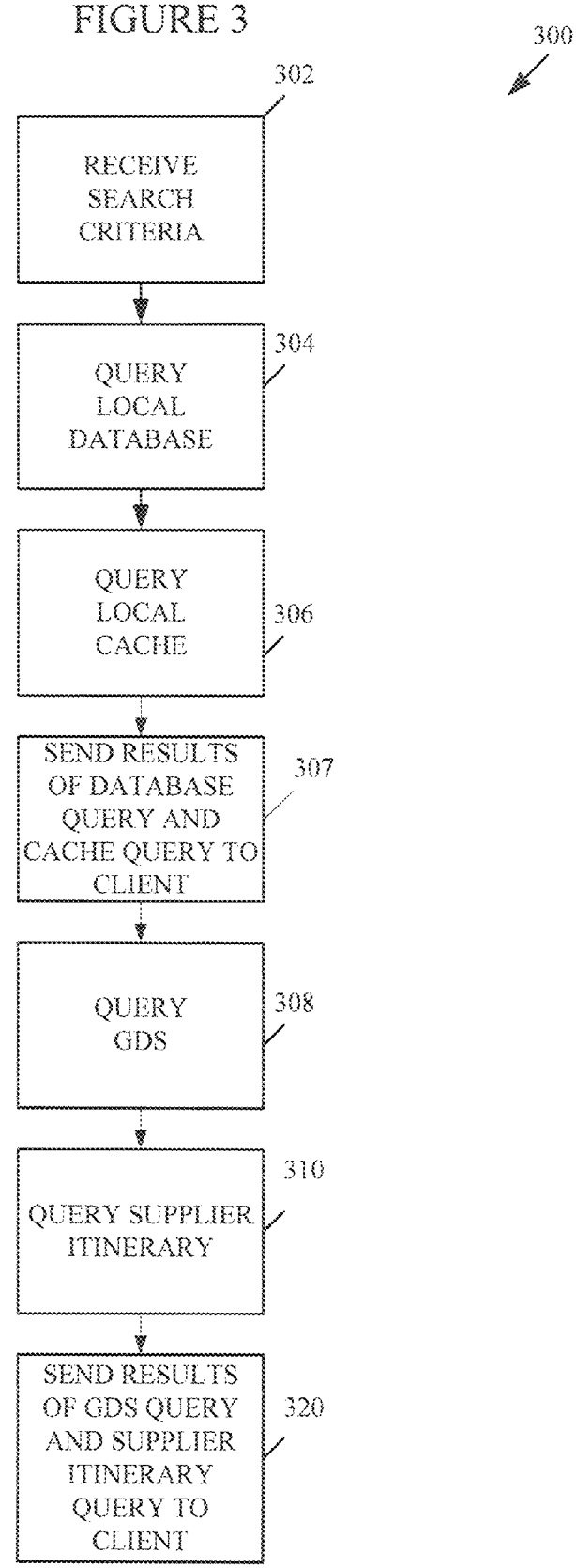
FIG. 3 depicts a search process, according to an embodiment of the invention.

FIG. 3 depicts a search process 300 according to an embodiment of the invention. A user interacting with a client computer 101 may input partial or complete travel search criteria, for example a trip origin, a first destination, a date of travel, and the like. The criteria may be transmitted over the network 102 to the schedule display system 200. In 302, the client interface module 207 may receive the search criteria. For example, several trip itineraries may be put in a search criteria. Results meeting this search criteria may be found by looking at the OAG data and/or cached data.

In 304, the database query module 203 may run queries against one or more databases or inventory systems, such as, for example, the schedule database 204. The schedule database 204 may include schedule data for airline flights, rail systems, other transportation options, or any combination thereof. The schedule database 204 may include only the schedules, not the actual availability, so that it may be queried rapidly using a relational database or other database technology because it may be essentially static (it may change infrequently). For example, OAG information may be very fast to look up (e.g., it may be sorted by departure and arrival airport). But OAG data may not have actual availability, up to date information (e.g., cancelled flight because of weather), or price information, or any combination thereof.

In 306, the cache query module 205 may run queries against one or more caches, for example the availability cache 206. In the event that users of client computers 101 have asked for similar schedules and actual availability in the past, the availability cache 206 may contain data indicating whether a given flight, rail journey, etc. has any seats available. The availability cache 206 may be less up to date than data contained in the GDS 106 or supplier itinerary system 107 in some instances, but the availability cache 206 may also be queried rapidly.

In 307, the client interface module 207 may send results obtained by the database query module 203 and cache query module 205 to the client computer 101 via the network 102.

In 308, the GDS query module 201 may query the external GDS 106 via the network 102 or a direct connection. For example, a GDS 106 may be contacted directly or cached GDS information may be stored so that it may be accessed faster. The cache information may be updated periodically.

In 310, the itinerary query module 202 may query the external supplier itinerary system 107 via the network 102 or a direct connection. For example, a supplier itinerary system 107 may be contacted directly or cached information may be stored so that it may be accessed faster. The cache information may be updated periodically.

The GDS 106 and supplier itinerary system 107 may have data about real time availability of travel options. As these systems may be maintained by third parties, and these queries may be more time consuming than local database or cache queries in some cases, the client interface module 207 may send results obtained by the database query module 203 and cache query module 205 to the client computer 101 before the GDS 106 and supplier itinerary system 107 are queried.

As results from the GDS 106 and supplier itinerary system 107 are received, in 320, the results may be sent to the client computer. For example, the client interface module 207 may send results obtained by the GDS query module 201 to the client computer 101, and the client interface module 207 may send results obtained by the itinerary query module 202 to the client computer 101. This may allow a schedule display of the client computer 101 to be updated as information is retrieved. Initial results may be displayed quickly, and this may allow a user to begin making travel decisions based on the initial results quickly. The client computer 101 may display concise schedule information, as described in greater detail below.

Figure 4A:
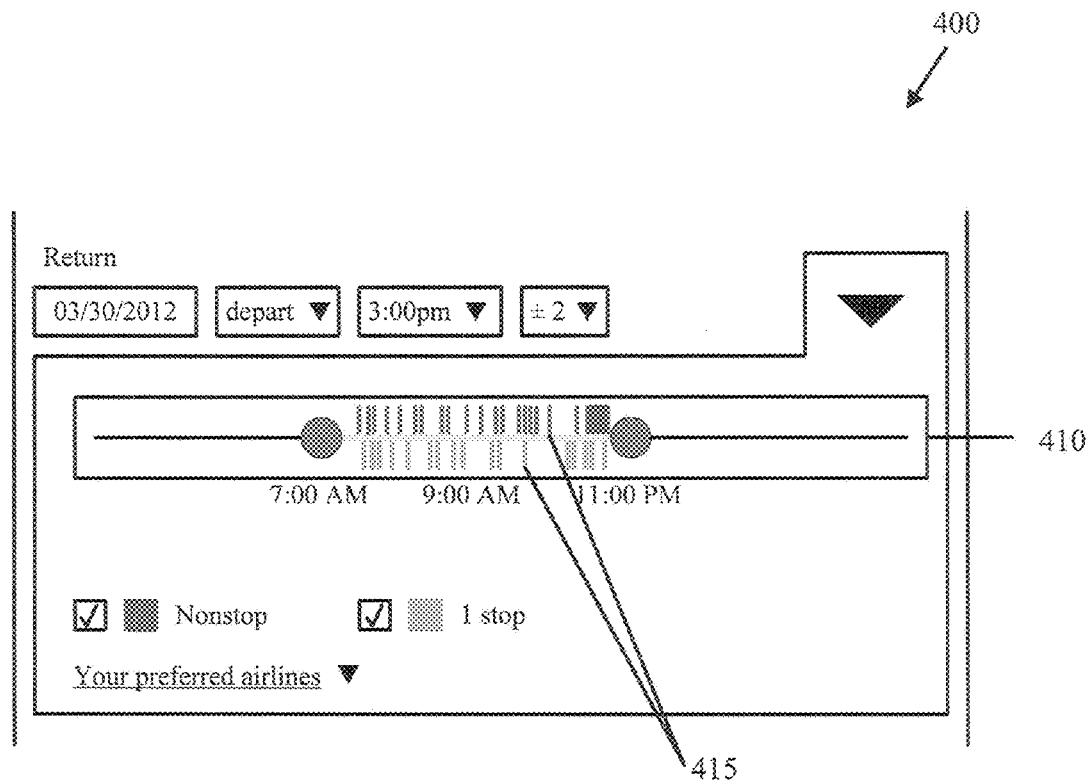

FIG. 4A depicts an interface 400 according to an embodiment of the invention. The interface 400 may be displayed on a screen associated with a client computer 101, for example. After a traveler provides their origin, their first destination, and the date of travel as described above, the system may perform processes such as those described with respect to FIG. 3 above. The resulting data may be sent to the client computer 101, and this may enable the client computer 101 to display a graphical interface 400 on screen to the traveler in near real time. Travel searches may generate hundreds or thousands of results for given travel queries. The visual presentation of those results may assist a user trying to identify a travel option for a trip being planned.

This interface 400 may include a timeline 410 and one or more rectangular regions 415. The rectangular regions 415 may each represent one or more itineraries. Shapes other than rectangles may be used to represent the various regions 415 on the timeline 410 in various embodiments. The regions 415 may be placed on the timeline 410 at locations corresponding to the departure date and time of the itinerary or itineraries, if the traveler specified a departure date and/or time. The regions 415 may be placed on the timeline 410 at a location corresponding to the arrival date and time of the itinerary or itineraries, if the traveler specified an arrival date and/or time. The regions 415 may be colored differently based on the number of connections or stops, for example. In some cases, such as for corporate travel systems, the regions 415 may also be colored differently based on whether or not the specific itinerary complies with a corporate travel policy. In another example, regions may be displayed above or below the timeline to designate either number of stops/connections or whether the itinerary is in or out of policy. The interface 400 example shows a traveler requesting departure at 3 PM on March $30^{th}$, with non-stop flights displayed in the upper row of the timeline and one-stop flights below. Another example interface may display in-policy flights above and out of policy flights below. If no itineraries are found for a search, a timeline 410 may be displayed without any rectangular regions 415, or the user may be informed of the failed search in some other way.

Figure 4B:

FIG. 4B depicts an interface according to an embodiment of the invention. In this example, only non-stop flights are shown. For the outbound flights, the regions 415 may be based on departure time, and for the return flight the regions 415 may be based on arrival time.

Figure 4C:
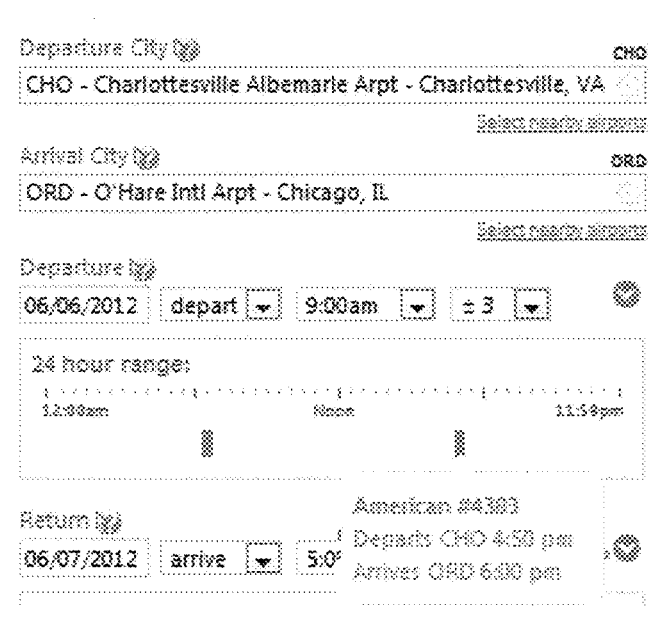

FIG. 4C depicts an interface according to an embodiment of the invention. In this example, if a user selects (e.g., by mousing over, clicking, touching, or otherwise selecting) a specific region, the itinerary represented by that region may be shown in greater detail. If multiple itineraries are available at similar times, multiple itineraries may be displayed. The initial display of the schedule may be concise, and more information may be retrieved without having to do the full travel search. In some examples, pricing may be displayed on selection as well.

In some examples, as the user changes search criteria, the timeline 410 and the regions 415 may automatically adjust to the new criteria. This can be performed on a web page, such as, for example, via AJAX (Asynchronous Javscript and XML) technology, as well as in a mobile application or client/server application. Additionally or alternatively, the user may be able to explicitly request a refresh by interacting with a refresh widget (e.g. a button).

Some users may be unable to perceive colors or may have disabilities that may prevent them from being able to interact with a computing device with a mouse or view a computer screen. Governmental entities (and some private corporations) may reject products unless the same product can be used by all employees. In some examples, the code that represents the timeline 410 and regions 415 on the display may be accompanied by additional instructions. An assistive technology (such as the screen reader JAWS) may use those extra instructions to display the information represented on the timeline 410, for example by reading the schedule or describing the timeline verbally to allow a user to interact with the application.

The timeline 410 may enable a traveler to learn about travel options before attempting a search that may eliminate appealing options. For example, a traveler who wishes to fly from Houston, Tex. to Bangalore, India may want to fly out on a specific Monday morning. However, the only flights that depart on weekday mornings may involve two connections. Were the traveler to fly out on an evening, the traveler may be able to fly on a one connection itinerary. Fewer connections may correspond to a shorter overall travel time and a lower risk of missed connections and itinerary disruptions. Because the timeline 410 may show flight times based on connection, if the user is interested in a one connection flight, they may now know to broaden their search criteria to encompass evening flights. In another example, a traveler may need to attend a noon meeting in Chicago. The traveler may not know if there is a flight that arrives early enough to be able to fly out the morning of the meeting, or if the traveler needs to fly in the night before the meeting. Before the traveler finalizes their search request, the timeline 410 may reveal that there are no morning flights that arrive in time for the meeting, and the traveler can choose to search for flights the night before the meeting.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the term "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

What is claimed is:

1. A method comprising:
   performing processing associated with receiving, with a client interface module in communication with a computer comprising a database and a cache, travel request data;
   performing processing associated with retrieving, with a database query module in communication with the computer, schedule data associated with the travel request data from the database, the schedule data being further associated with a scheduled travel time;
   performing processing associated with retrieving, with a cache query module in communication with the computer, availability data associated with the travel request data from the cache, the availability data being further associated with an available travel time;
   performing processing associated with generating, with the client interface module, representation data representing the schedule data and the availability data, the representation data representing the schedule data and/or the availability data differently based on a whether an itinerary complies with an organization's travel policies; and
   performing processing associated with sending, with the client interface module, the representation data via a computer network.

2. The method of claim 1, further comprising:
   performing processing associated with receiving, with the client interface module, updated travel request data;
   performing processing associated with retrieving, with the database query, updated schedule data associated with the updated travel request data from the database, the schedule data being further associated with an updated scheduled travel time;
   performing processing associated with retrieving, with the cache query, updated availability data associated with the updated travel request data from the cache, the updated availability data being further associated with an available travel time;
   performing processing associated with updating, with the client interface module, the representation data to include the updated schedule data and the updated availability data; and
   performing processing associated with sending, with the client interface module, the updated representation data via the computer network.

3. The method of claim 1, further comprising performing processing associated with generating, with the client interface module, instructions that permit a screen reader or other assistive technology to verbally describe the representation data.

4. The method of claim 1, wherein a region on the displayed representation data corresponds either to a single travel itinerary or to multiple travel itineraries that have similar time characteristics.

5. The method of claim 1, wherein the itinerary comprises: airline, rail system, date of departure, time of departure, date of arrival, time of arrival, departure location, arrival location, locations of any intermediate stops or connections, date and/or time of any intermediate stops or connections, price of the itinerary, or any combination thereof.

6. The method of claim 1, further comprising performing processing associated with receiving, with the client interface module, a user request to display the representation data, wherein the user request comprises a hovering of a cursor over the region, a mouse click on the region, a touch screen input on the region, or any combination thereof.

7. The method of claim 1, wherein the scheduled travel time and the available travel time are travel times for transportation options comprising airline flights, rail travel, or any combination thereof.

8. The method of claim 1, wherein the travel request data includes a travel event type and a travel request attribute.

9. The method of claim 8, wherein the travel event type comprises air travel, rail travel, or any combination thereof.

10. The method of claim 8, wherein the travel request attribute comprises a departure location, a destination, a date of desired departure, a date and time of desired departure, a date and time range of desired departure, a date of desired arrival, a date and time of desired arrival, a date and time range of desired arrival, a mode of transportation, a provider of transportation, or any combination thereof.

11. The method of claim 1, wherein the representation data further represents the schedule data and/or the availability data differently based on a number of stops or connections.

12. The method of claim 1, wherein the database comprises data from a data source that is fast and/or inexpensive to obtain.

13. The method of claim 1, wherein the database comprises OAG data.

14. The method of claim 1, wherein the cache comprises data that is slow and/or expensive to obtain.

15. The method of claim 1, further comprising: performing processing associated with searching real-time availability data based on search criteria determined after viewing the availability data.

16. The method of claim 15, wherein the real-time availability data comprises data from a data source that is slow and/or expensive to obtain.

17. The method of claim 15, wherein the real-time availability data comprises GDS data and/or supplier inventory data.

18. A system comprising:
a processor configured for:
receiving, with a client interface computer module comprising a database and a cache, travel request data;
retrieving, with a database query module, schedule data associated with the travel request data from the database, the schedule data being further associated with a scheduled travel time;
retrieving, with a cache query module, availability data associated with the travel request data from the cache, the availability data being further associated with an available travel time;
generating, with the client interface module, representation data representing the schedule data and the availability data, the representation data representing the schedule data and/or the availability data differently based on whether an itinerary complies with an organization's travel policies; and
sending, with the client interface module, the representation data via a computer network.

19. The system of claim 18, wherein the processor is further configured for:
receiving, with the client interface module, updated travel request data;
retrieving, with the database query, updated schedule data associated with the updated travel request data from the database, the schedule data being further associated with an updated scheduled travel time;
retrieving, with the cache query, updated availability data associated with the updated travel request data from the cache, the updated availability data being further associated with an available travel time;
updating, with the client interface module, the representation data to include the updated schedule data and the updated availability data; and
sending, with the client interface module, the updated representation data via the computer network.

20. The system of claim 18, wherein the processor is further configured for generating, with the client interface module, instructions that permit a screen reader or other assistive technology to verbally describe the representation data.

21. The system of claim 18, wherein a region on the displayed representation data corresponds either to a single travel itinerary or to multiple travel itineraries that have similar time characteristics.

22. The system of claim 18, wherein the itinerary comprises: airline, rail system, date of departure, time of departure, date of arrival, time of arrival, departure location, arrival location, locations of any intermediate stops or connections, date and/or time of any intermediate stops or connections, price of the itinerary, or any combination thereof.

23. The system of claim 18, wherein the processor is further configured for receiving, with the client interface module, a user request to display the representation data, wherein the user request comprises a hovering of a cursor over the region, a mouse click on the region, a touch screen input on the region, or any combination thereof.

24. The system of claim 18, wherein the scheduled travel time and the available travel time are travel times for transportation options comprising airline flights, rail travel, or any combination thereof.

25. The system of claim 18, wherein the travel request data includes a travel event type and a travel request attribute.

26. The system of claim 25, wherein the travel event type comprises air travel, rail travel, or any combination thereof.

27. The system of claim 25, wherein the travel request attribute comprises a departure location, a destination, a date of desired departure, a date and time of desired departure, a date and time range of desired departure, a date of desired arrival, a date and time of desired arrival, a date and time range of desired arrival, a mode of transportation, a provider of transportation, or any combination thereof.

28. The system of claim 18, wherein the representation data further represents the schedule data and/or the availability data differently based on a number of stops or connections.

29. The system of claim 18, wherein the database comprises data from a data source that is fast and/or inexpensive to obtain.

30. The system of claim 18, wherein the database comprises OAG data.

31. The system of claim 18, wherein the cache comprises data that is slow and/or expensive to obtain.

32. The system of claim 18, further comprising: performing processing associated with searching real-time availability data based on search criteria determined after viewing the availability data.

33. The system of claim 32, wherein the real-time availability data comprises data from a data source that is slow and/or expensive to obtain.

34. The system of claim 32, wherein the real-time availability data comprises GDS data and/or supplier inventory data.

\* \* \* \* \*